United States Patent [19]

Ziberna

[11] Patent Number: 5,725,930
[45] Date of Patent: *Mar. 10, 1998

[54] SUPPLY FEEDSTOCK FOR WORKPIECE FINISHING MACHINE

[75] Inventor: Frank Ziberna, Elmhurst, Ill.

[73] Assignee: Bi-Link Metal Specialties, Elmhurst, Ill.

[*] Notice: The term of this patent shall not extend beyond the expiration date of Pat. No. 5,503,895.

[21] Appl. No.: 615,872

[22] Filed: Mar. 14, 1996

Related U.S. Application Data

[63] Continuation of Ser. No. 123,717, Sep. 20, 1993, Pat. No. 5,503,895.

[51] Int. Cl.$^6$ ....................................... B32B 3/24
[52] U.S. Cl. ................. 428/131; 428/33; 428/58; 428/57; 428/596; 428/119; 428/156; 428/132; 428/134; 428/597; 428/587; 428/582; 428/577; 428/571; 428/572; 428/524.8; 428/906; 29/564.6; 29/417; 29/33 Q; 206/717
[58] Field of Search ................. 428/131, 33, 58, 428/57, 596, 119, 156, 132, 134, 597, 587, 582, 577, 571, 572, 542.8, 906; 29/564.6, 417, 33 Q; 206/717

[56] References Cited

U.S. PATENT DOCUMENTS

| | | | |
|---|---|---|---|
| 3,531,861 | 10/1970 | Golbeck et al. | 29/417 |
| 3,758,703 | 9/1973 | Golden et al. | 29/193.5 |
| 4,554,404 | 11/1985 | Gilder, Jr. et al. | 206/330 |

*Primary Examiner*—William Watkins
*Attorney, Agent, or Firm*—Lockwood, Alex, Fitzgibbon & Cummings

[57] ABSTRACT

A supply feedstock intended for use in a workpiece finishing machine wherein individual workpieces are successively separated and presented in a predetermined fashion to an automated loading means. The feedstock includes a plurality of individual workpieces arranged in side-by-side order in the form of a continuous belt, or bandolier, of workpieces, each of the workpieces being interconnected at head and tail portions of the workpieces by integral webs, successive workpieces being trimmed from the bandolier and presented to a loading means, while the separated webs are discharged to waste.

26 Claims, 4 Drawing Sheets

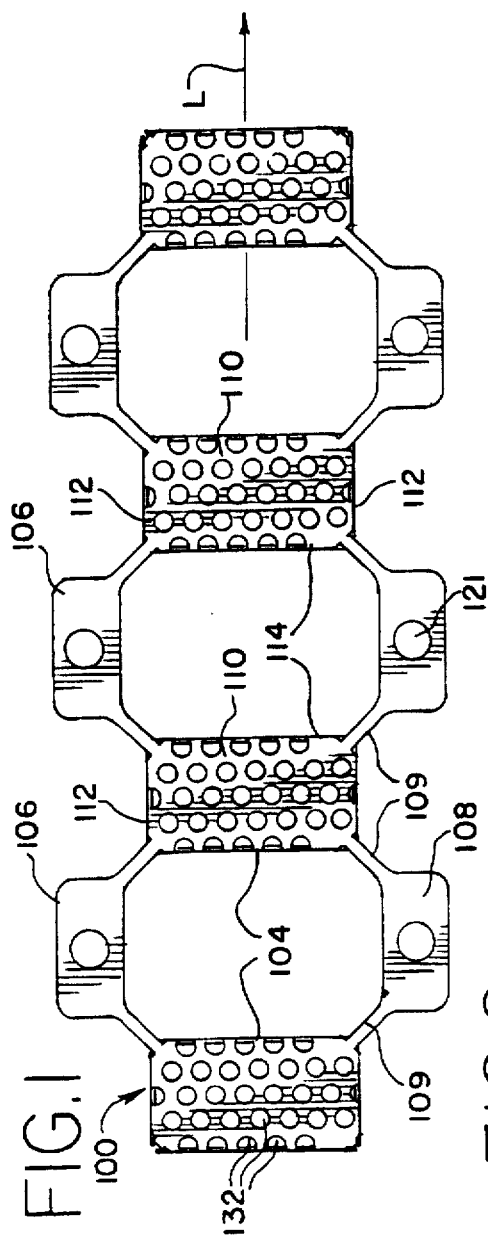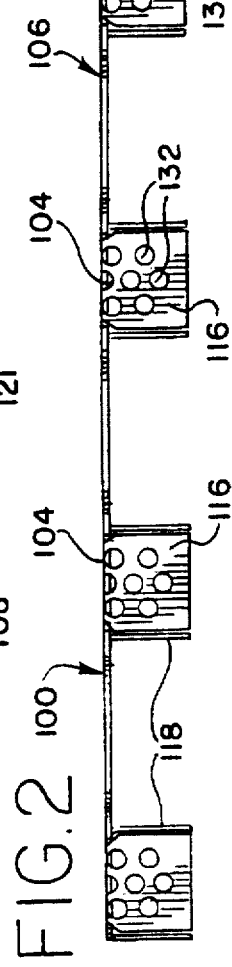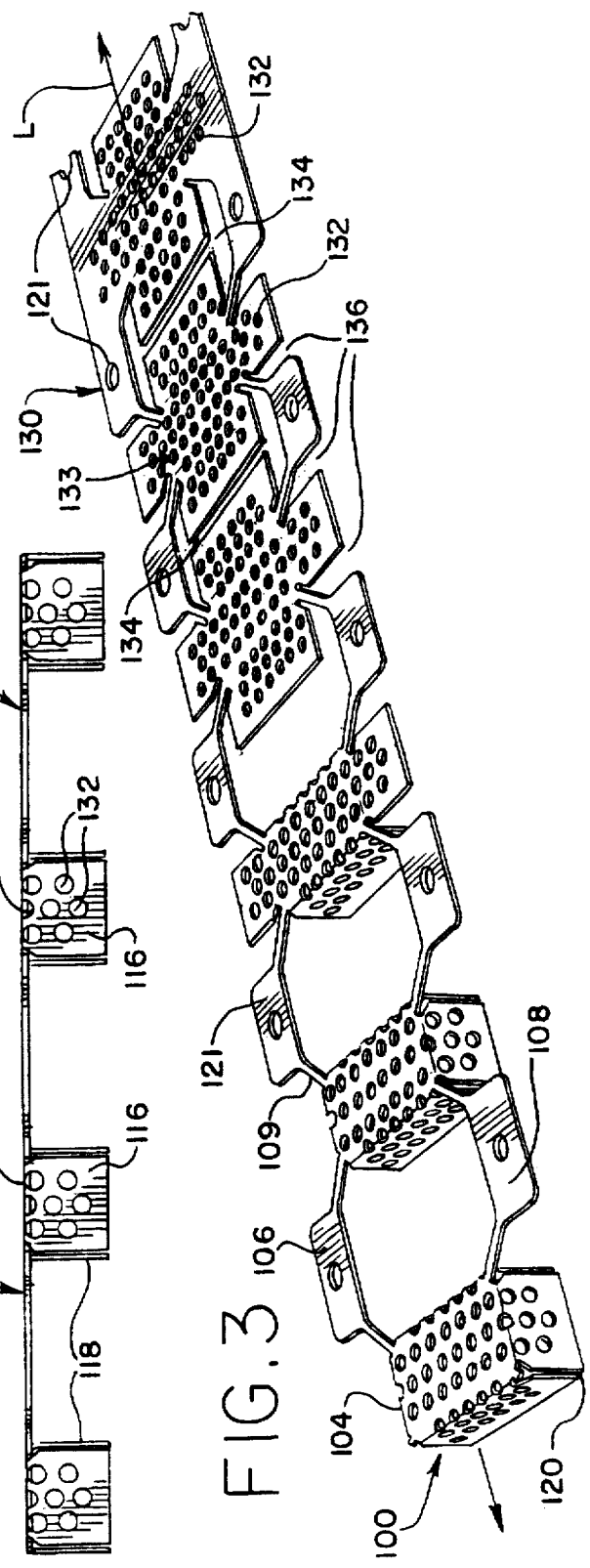

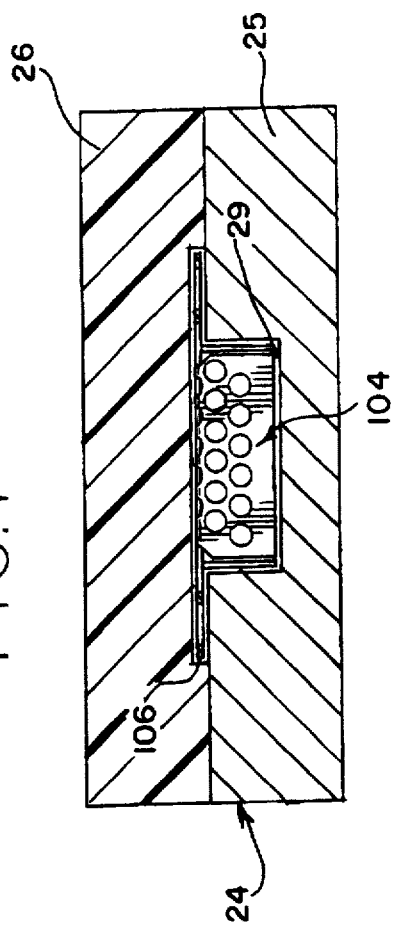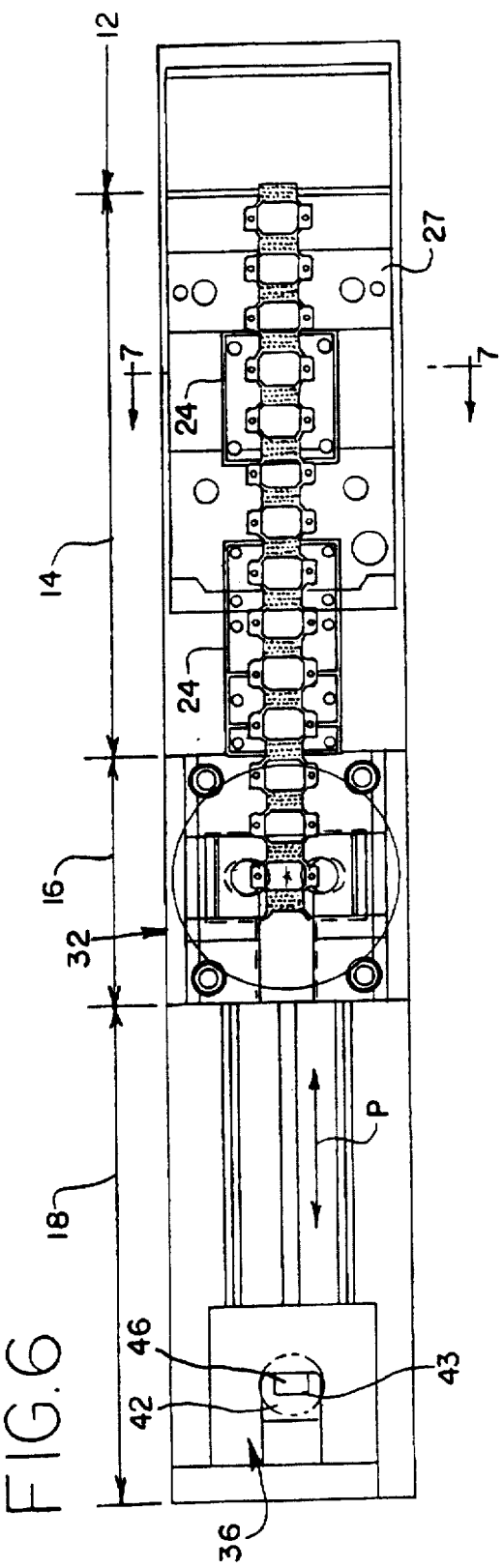

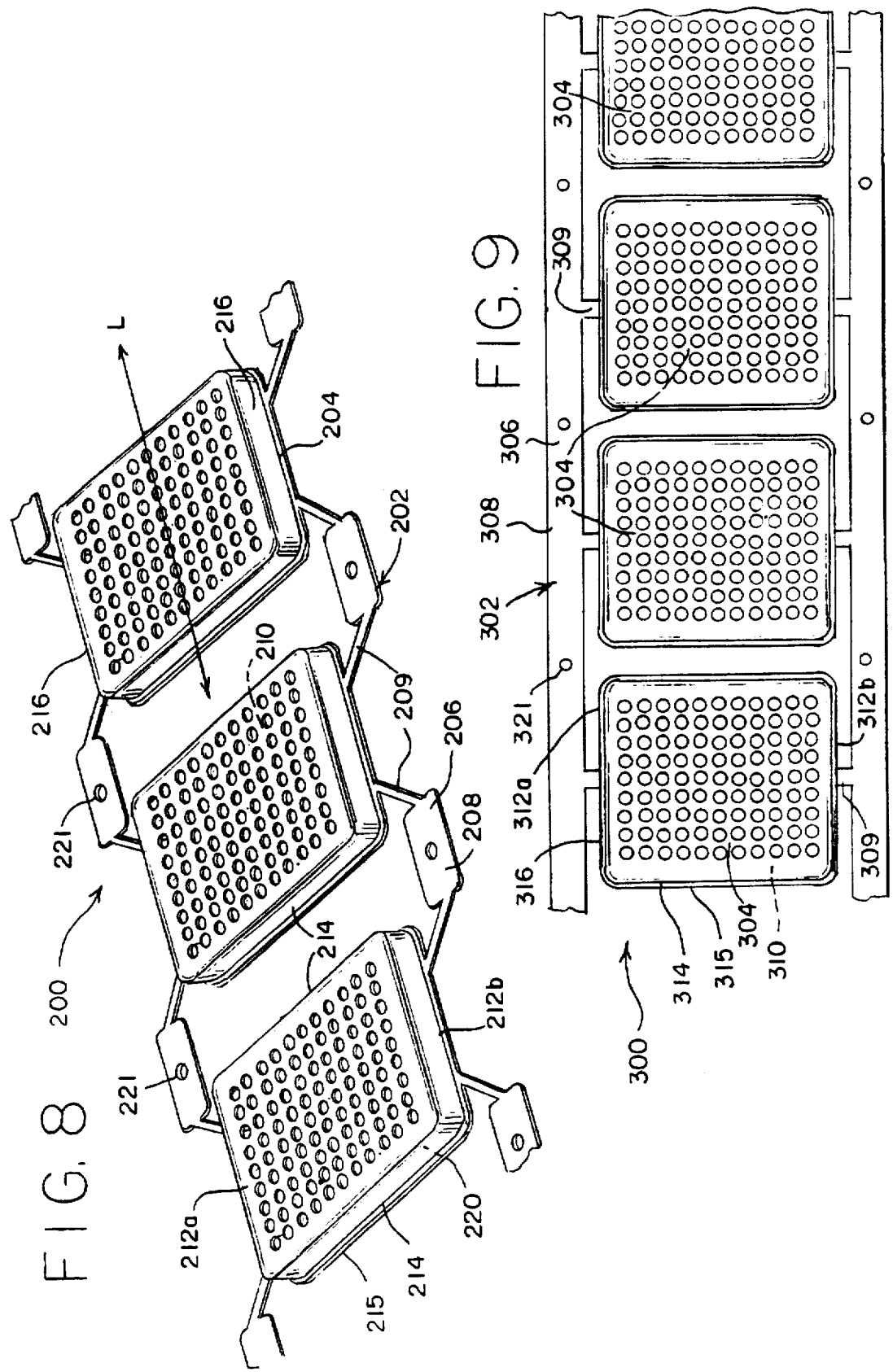

SUPPLY FEEDSTOCK FOR WORKPIECE FINISHING MACHINE

REFERENCE TO RELATED APPLICATIONS

This application is a continuation of prior application Ser. No. 08/123,717, filed Sep. 30, 1993, now U.S. Pat. No. 5,503,895.

BACKGROUND AND SUMMARY OF THE INVENTION

The present invention relates generally to supply feedstocks for workpiece finishing machines and, more particularly, to a supply feedstock having a plurality of individual workpieces successively arranged for separation by a workpiece finishing machine and sequential presentation to a loading means.

Robotic assemblers or loaders are used quite often in the manufacture of the electronic components. Such components include cellular telephones, pagers and the like. In the assembly of these electronic components it is beneficial to have certain portions of a component if not the entire component such as circuit boards assembled by automated machineries such as robotic loaders assemblers and welders. These robotic devices may include an arm which picks up a single part from a predesignated pickup location and moves it to a location where it is subsequently inserted or installed onto a portion of the circuit board or other portion of the electronic component. In order to maintain production line efficiencies, the robots need to have the individual parts repeatedly presented to them in a predesignated orientation and location. Deviation from this orientation and location may result in an electronic component which is lacking a particular part. Many electrical parts used in the assembly of such electronic components are delicate in nature because they are often stamped and formed from a thin sheet metal, and therefore, presenting the parts to a robot by way of a part hopper may lead to jamming of the overall system and possible damage to the part as well as obvious downtime of the production line.

To achieve a constant flow of parts to a robot, various types of feedstocks have been developed which deliver a plurality of individual parts to an assembly means. Some types of these feedstocks are often referred to as carrier strips or carrier tapes. One such type of carrier tape is known as "debossed tape and reel" and consists of a plastic carrier tape with a plurality of recessed pockets or openings formed therein along the longitudinal extent of the tape. A part is placed in each of the pockets and a plastic sealing tape or bonding tape is adhesively applied to the carrier tape, thereby sealing the parts in their respective pockets. The carrier tape is fed into a robot assembler and the seal tape is peeled away and the part removed and installed. Both the seal tape and the carrier tape are then discharged to waste by the robot. Examples of such constructions are described in U.S. Pat. Nos. 4,712,675 and 4,781,953. However, human insertion of the parts into the pockets is often required and the two-part nature of the debossed tape is expensive. Additionally, a specific orientation of the parts in the pocket must also be maintained for pick-up by the robot loader.

Another type of carrier type is known by the tradename of "GPAX" and is described in U.S. Pat. Nos. 4,583,641 and 4,757,895. In a GPAX-type structure, a carrier type is provided with a plurality of holes and intervening slots punched into it for its longitudinal extent. The holes are adapted to engage legs or stubs of each electrical part to insure proper and secure positioning of the part on the tape. A plastic bonding tape overlays the carrier tape and parts and is pressed or stitched into the carrier tape between adjacent parts. This bonding tape offers protection to the parts and retains the parts in place on the carrier tape. This type of carrier tape construction shares certain disadvantages with the debossed tape and reel construction previously described. For example, the assembled tapes are composed of multiple pieces and thus increases the amount of waste generated by the process. Neither of these constructions include or even suggest a carrier type or supply feedstock which is created during the forming of the parts contained within the carrier tape.

The present invention is directed to a supply feedstock which overcomes the aforementioned disadvantages and provides benefits not obtainable with the aforementioned constructions.

In accordance with the principles of the present invention, a supply feedstock intended for use in a finishing machine is provided in the form of a succession of individual workpieces, or parts, arranged in sequential order in a continuous coil or belt. The continuous coil takes on the appearance of a bandolier of individual workpieces. The workpieces are arranged in adjacent, or side-by-side, order by a series of webs which interconnect adjacent workpieces along the length of the feedstock. The webs are attached to the workpieces at points where they are easily trimmed off by, for example, a punch press or die in a finishing machine which sequentially separates the workpieces from the feedstock and presents the workpiece to a robotic loader or assembler.

In another principal aspect of the present invention, each web is disposed outside of the general perimeter of each workpiece to reduce the amount of waste generated during separation of workpieces from the feedstock as well as to permit the forming of the workpiece in place within the feedstock. The webs may also contain a suitable means for indexing feedstock within the finishing machine.

In yet another principal aspect of the present invention, each workpiece formed within the feedstock includes a surface which is presented to a robotic loader after trimming of the workpiece from the feedstock. This presentation surface may be planar, or it may be defined by workpiece sidewall portions which form edges of the presentation surface. These sidewalls cooperate with the presentation surface and define an engagement space which is engaged by a part positioning horn or other suitable means of the finishing machine.

Accordingly, it is an object of the present invention to provide an improved supply feedstock for finishing machines which trims a part from the feedstock and presents the part to a robotic loader or assembler.

Another object of the present invention is to provide a supply feedstock containing a plurality of individual workpieces intended for use in a finishing machine having means for separating an individual workpiece from the feedstock and subsequently presenting the workpiece in sequential order to a robotic loader or assembler, wherein the feedstock includes a plurality of individual workpieces arranged sequentially in adjacent fashion and in a predetermined spacing, each of the workpieces being maintained and interconnected with each other by integral, planar webs, which maintain the workpieces in their predetermined spacing.

Yet another object of the present invention is to provide a supply bandolier for a finishing machine wherein the bandolier is in the form of a continuous belt of workpieces arranged in side-by-side order, the workpieces being interconnected by web portions extended between adjacent workpieces which web portions are discharged to waste during separation of the workpieces from the bandolier, each of the workpieces having a robot presentation surface disposed between the associated web portions, the presentation surface further including an engagement space which is adapted to engage a part presentation means of the finishing machine.

These and other features and objects of the present invention will become apparent from a reading of the following detailed description.

BRIEF DESCRIPTION OF THE DRAWINGS

In the course of the following detailed description, reference will be made to the attached drawings wherein like reference numerals identify like parts and wherein:

FIG. 1 is a plan view of a supply feedstock constructed in accordance with the principles of the present invention;

FIG. 2 is an elevational view of FIG. 1;

FIG. 3 is a general perspective view showing how the supply feedstock of FIG. 1 is constructed;

FIG. 4 is an exploded perspective view, partially in section of an individual workpiece and workpiece positioning means;

FIG. 6 is a plan view of the finishing machine of FIG. 5, with a feedstock engaged by the machine;

FIG. 7 is a cross-sectional view of the machine of FIG. 5, taken along lines 7—7 of FIGS. 5 & 6;

FIG. 8 is a perspective view of an alternate embodiment of a feedstock in accordance with the present invention; and, FIG. 9 is a plan view of another embodiment of a feedstock in accordance with the present invention;

DETAILED DESCRIPTION OF THE INVENTION

Figure 5:
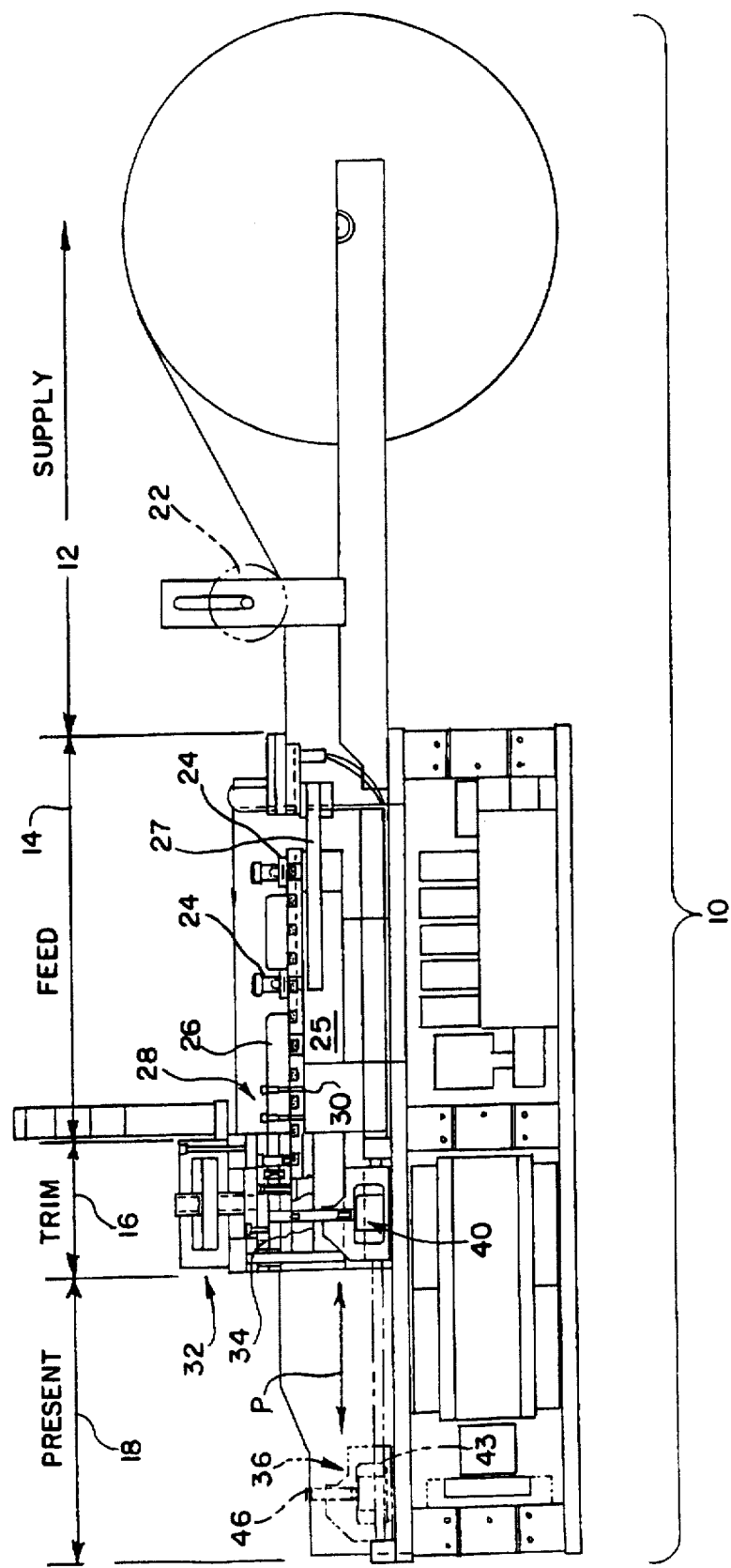
FIG. 5 is an elevational view of a workpiece finishing machine adapted to use a supply feedstock of FIG. 1.

Referring to the drawings, and in particular FIGS. 1–3, there is shown a supply feedstock 100 constructed in accordance with the principles of the present invention. The feedstock 100 is intended for use in a workpiece finishing machine 10 (shown in FIGS. 5–7) as part of an overall automated production line suitable for the assembly of components which may be handled and assembled by robots such as electronic components.

As illustrated, the feedstock 100 typically takes the form of a bandolier 102 having a plurality of individual workpieces 104 disposed adjacent each other in a side-by-side relationship. The workpieces 104 are interconnected and governed in a predetermined spacing apart from each other by plurality of webs 106 which extend between adjacent workpieces for the entire length of the bandolier 102 in the manner shown. The webs 106 include a generally planar portion 108 which is disposed in a common plane with a surface 110 of each workpiece 104. The webs 106 may further include leg, or stem, portions 109 which extend from the planar portions to adjacent workpieces 104. The webs 106 interconnect the head and tail portions, respectively 112a, 112b of each of the work pieces 104.

Each workpiece 104 of the feedstock 100 preferably includes a presentation surface 110. This surface 110 may have multiple edges 112, 114 which extend around the perimeter of the presentation surface 110 and the workpiece 104. The edges 112, 114 may contain integral sidewalls 116, 118 which extend outwardly from the surface 110. As will be noted later, these edges 112, 114 and sidewalls 116, 118 cooperate to define an engagement space, or pocket, 120 of each workpiece 104 which is adapted to receive a workpiece positioning means. Although five sidewalls are shown (including the four sidewalls 116, 118 and the presentation surface 110) as defining the engagement space 120, it will be noted that a lesser number of sidewalls will suffice. The workpiece 104 may also be substantially planar in nature and include a rib (not shown) formed integrally or some other suitable means therein which provides a point or means for engaging a workpiece positioning means.

The bandolier 102 is preferably formed from a thin gauge sheet metal and may be advantageously formed from a coil 130 of sheet metal passing through a progressive die wherein the coil 130 is sequentially stamped and formed into the final feedstock structure as shown in the drawings. It is conceivable that the bandolier 102 and its associated workpieces 104 may be constructed from other suitable materials, such as plastics or composites, depending on the structural characteristics of the materials.

FIG. 3 best illustrates how the feedstock 100 is formed. A metal coil 130 is fed into a progressive die wherein registration, or indexing, openings 121 may be punched into the coil 130 at predetermined locations along the sides 131 of the coil 130. The workpiece 104 is shown in this Figure as a perforated shield and the perforations 132 are formed by successive punches of the die. Next, the workpiece sidewalls 118 which cross a longitudinal axis L of the coil 130 are formed by striking a slot 134 in the coil 130 between the perforated areas 133 which will eventually define the finished workpiece 104. Additional slots 136 are subsequently punched in the opposing sides 131 of the coil 130 which serve to define the sidewalls 116 of the workpiece 104 which do not intersect the axis of the coil but which may be parallel to such an axis. After the sidewalls 116, 118 are defined in the coil 130, the sidewalls 118 are formed by stamping the same so that they angularly extend away from the surface 110 of the workpiece 104. The remaining sidewalls 116 are similarly stamped so that they also angularly extend away from the surface 110 of the workpiece and such that the four sidewalls 116, 118 cooperate together with the presentation surface 110 to define an engagement space or pocket 120 in each workpiece 104.

Returning to FIG. 1, it can be seen that the web planar and leg portions 108, 109 lay outside the edges of the workpieces 104 which are generally parallel to the axis of the bandolier 102. The webs 106 are trimmed from the workpiece 104 when a workpiece 104 is separated from the bandolier 102 in serial order such as by way of a punching or trimming die 32 (FIGS. 5 & 6). The webs serve to maintain the workpieces 104 in a predetermined spacing between adjacent workpieces and in a generally parallel relationship which parameters are tailored to the feeding and trimming operations of the finishing machine 10. Additionally, with the feedstock 100 in a bandolier format, it may be easily rolled around a reel for attachment and insertion into a finishing machine 10.

Turning now to FIG. 5, a workpiece finishing machine 10 is shown in which the feedstock 100 of the present invention is used to provide individual workpieces 104 for presentation to a robotic loader or assembler 11. This finishing machine 10 is the subject of my co-pending patent application, entitled "Workpiece Finishing and Presentation Machine", Ser. No. 08/123,718, now U.S. Pat. No. 5,483,857, filed simultaneously herewith. As described in the specification of that application, the finishing machine 10 is preferably numerically controlled and includes a supply area 12, a feed area 14, a trim area 16 and a workpiece presentation area 18. Generally, the feedstock 100 is fed into the finishing machine 10 and moved to the trimming area 16 whereby a trimming means sequentially separates each workpiece 104 from the feedstock 100 and moves each separated individual workpiece 104 into the positioning area 18 into a predetermined location for pick-up by robotic loader or assembler 11 (shown in phantom).

The feedstock 100 is mounted on a supply reel 20 and engages a tensioning roller 22 to apply a preselected amount of tension to the feedstock 100 to prevent the same from prematurely advancing within the machine 10 and to take up any slack which may occur during operation of the machine. The leading edge of the feedstock 100 is threaded into the feed area 14 wherein one or more feedstock clamps 24 engage the feedstock 100, particularly the webs 106 thereof. The clamps 24 are mounted to a sliding means 27 which reciprocates horizontally along the axis of the feedstock 100 and machine. When the clamps 24 reciprocate, they engage the webs 106 and move the feedstock along a machine feedpath. Each clamp 24 includes a lower base member 25 which contains a channel 29 defining a passage through which the feedstock 100 passes. The clamps 24 also include vertically reciprocatable cover plates 26 which clamp the part in place during the reciprocating feed movement of the clamps 24. The cover plates 26 also serve to prevent the feedstock 100 from buckling along its length while advancing through the finishing machine 10.

Disposed between the feed area 12 and the trim area 16 is a feedstock locating means 28 which includes one or more vertically moveable feedstock indexing pins 30 which are adapted to engage the opening 121 of the feedstock webs 106. These pins 30 are utilized to ensure proper alignment of the feedstock 100 within the machine 10. The pins 30 are initially inserted into the web openings 121 and the machine 10 is energized. The pins 30 are then released and the machine 10 activated. The feed clamps 24, slider mechanism 27 and positioning means 36 are preferably operated by way of pneumatic pressure regulated by a suitable regulating means and which are synchronized by way of a suitable controller such as a programmable numerical controller. With the feedstock 100 positioned properly, air is supplied to the feed clamps 24 which grip the feedstock and advance it into the trim area 16. The feedstock 100 enters a cutting cylinder 32 wherein a cutting punch 34 is retracted upwardly into an open or ready position. Simultaneously, a workpiece positioning means 36 advances into a cavity, or nest, 40 located in the cutting cylinder 32 underneath the cutting punch 34. As the die closes, the cutting punch 34 contacts the workpiece 104, it shears off the webs 106 interconnecting the workpieces 104 together at the points on connection between the leg portion 109 and the workpiece 104. Simultaneously, the workpiece 104 is pushed into the nest 40 underneath the cutting cylinder 32 and is forced into engagement with the workpiece positioning means 36, shown illustrated as an air-operated reciprocating part horn 42.

The horn 42 is mounted on an air-operated reciprocating carriage assembly 43 which reciprocates in and out of the cutting cylinder 32 along path P. The horn 42 preferably has a configuration generally complementary to the engagement space 120 formed in the workpiece by the sidewalls thereof 116, 118. The horn head 43 enters the workpiece engagement space 120 and engages the presentation surface 110 of the workpiece 104. It simultaneously retracts downwardly to clear the cutting cylinder 32 while its associated slider mechanism retracts out of the cutting cylinder 32 and into the machine presentation area 18 whereby the horn 42 then extends vertically into a predetermined position for pick up by a robotic loader or assembler 11. The horn 42 may include a workpiece sensor 46 such as an optical sensor 48 disposed within a area of the horn head 44 where a portion of the workpiece overlies it and indicates to the machine controller that a workpiece 104 is in place on the horn 42.

FIG. 8 illustrates an alternate embodiment of a feedstock 200 according to the invention, wherein a bandolier 202 of workpieces 204 are interconnected by webs 206 attached to the head and tail portions (or opposing ends) 212a, 212b, respectively of the workpieces 204. The workpieces 204 include multiple sidewalls 214, 216 which terminate in a lower rim or lip 215 which surrounds the machine engagement space 220 and defines an end thereof. A machine engagement surface 210 is located at the top of this space 220 and it cooperates with the sidewalls 214, 216 to define the space 220. The webs 206 include planar portion 208 outside of the workpiece head and tails 212a, 212b and are interconnected thereto by leg portions 209.

FIG. 9 illustrates yet another embodiment wherein feedstock 300 has its workpieces 304 arranged in serial and spaced order by continuous webs 306 extending the entire length of the coil 302. The workpieces 304 have an engagement space 320 defined therein by sidewalls 314, 316. Legs 309 extend from web planar portions 308 and connect to the workpiece rim 315. The webs and rim lie in a common plane.

Certain advantages and benefits are achieved by the present invention such as a reduction in the overall waste generated by the finishing process inasmuch as the webs 106 do not extend along the entire length of the bandolier 102 in the form of marginal control strips. Additionally, because the webs 106 maintain a predetermined spacing between adjacent workpieces 104, the bandolier 102 may accommodate non-planar or multi-dimensional workpieces, i.e., ones having a plurality of angularly disposed members, such as sidewalls 116, 118 which cooperate with the engagement surface 110 to define the machine presentation means engagement space 120 without compromising the overall integrity of the feedstock. Additionally, the feedstock webs 106 provide points of engagement for the finishing machine clamps 24 to advance the feedstock 100 through the machine 10.

It will be seen that while certain embodiments of the present invention have been shown and described, it will be obvious to those skilled in the art the changes and modifications may be made therein without departing from the true spirit and scope of the invention.

I claim:

1. A supply strip of workpieces for supplying a succession of individual workpieces to a machine which separates individual workpieces from the supply strip and presents the separated workpieces to a loading means, the machine including means for advancing said supply strip therethrough said supply strip comprising: a plurality of individual workpieces assembled in the form of a continuous belt, each workpiece having a presentation surface for engaging a presenting means of said machine, the presentation surface being defined by multiple edges of said workpiece, said individual workpieces being disposed generally adjacent another in a spaced-apart relationship and separated from each other by intervening spaces along a length of said supply strip, the workpieces being interconnected successively with one another by individual webs, the webs extending alongside said workpieces for the length of said supply strip, said webs maintaining said individual workpieces in said spaced-apart relationship, said webs including planar portions defining advancement surfaces of said supply strip which are engaged by the advancement means of said machine, said webs being disposed outside of said workpiece edges, and said web planar portions and said workpiece presentation surfaces being disposed in different planes.

2. The supply strip as defined in claim 1, wherein said planar portions include means for engaging an indexing means of said machine, said indexing means and said planar portion advancement surfaces being disposed in coincident planes.

3. The supply strip as defined in claim 1, wherein each of said webs further include a pair of leg portions extending from said web planar portions to said workpiece edges, said web planar and leg portions being disposed generally outside said workpiece edges, said workpiece presentation surfaces being disposed in a different plane than said leg portions.

4. The supply strip as defined in claim 1, wherein said webs include elongated continuous rails which extend lengthwise along said supply strip.

5. The supply strip as defined in claim 1, further including leg portions extending between said webs and said workpiece edges, said leg portions and said web planar portions being disposed in a common plane.

6. The supply strip as defined in claim 5, wherein said leg portions extend between said webs and said workpieces at an angle with respect to a longitudinal axis of said supply strip.

7. The supply strip as defined in claim 6, wherein two of said workpiece multiple edges define opposing ends of each of said workpieces and said leg portions extend between said webs and said workpiece opposing ends.

8. The supply strip as defined in claim 1, wherein each of said workpieces includes multiple sidewalls corresponding in number to said workpiece multiple edges, and said multiple sidewalls cooperate to define a machine presenting means engagement space adjacent each presentation surface of each workpiece.

9. The supply strip as defined in claim 8, wherein said workpiece sidewalls extend transversely to a longitudinal axis of said supply strip.

10. A supply feedstock for supplying workpieces in serial order to a processing machine which successively separates single workpieces from the feedstock and subsequently presents the separated workpieces to a loading means after separation, said supply feedstock comprising: a plurality of individual workpieces assembled in the form a continuous coil having two outer longitudinal edges, each individual workpiece having a machine engagement surface for engaging a transfer means of said processing machine after separation from said feedstock, said workpieces being disposed interior of the outer edges of said supply feedstock in spaced-apart order, said workpieces further being interconnected successively with one another by corresponding pairs of web portions extending only between pairs of workpieces such that each pair of web portions corresponds to a pair of workpieces within said feedstock, each of the web portions having longitudinal exterior and interior edges, said web portions including advancement surfaces for engaging a feedstock advancement means of said processing machine to sequentially advance said feedstock through said processing machine, the web portion advancement surfaces being disposed along the length of said coil between said web longitudinal interior edges and said coil outer longitudinal exterior edges exterior of said workpieces, said web portion planar advancement surfaces permitting said feedstock to be engaged by said processing machine advancement means and advanced through said processing machine irrespective of the plane of said individual workpiece engagement surfaces.

11. The supply feedstock as defined in claim 10, wherein said web portions include means for engaging an indexing means of said processing machine.

12. The supply feedstock as defined in claim 11, wherein said indexing means engaging means are disposed on said web portion advancement surfaces.

13. The supply feedstock as defined in claim 10, wherein said web portions are integrally formed with said workpieces.

14. The supply feedstock as defined in claim 10, wherein said workpieces include multiple edges which cooperatively define said workpiece machine engagement surfaces.

15. The supply feedstock as defined in claim 10, wherein said web portions lie in a different plane than said workpiece engagement surfaces.

16. The supply feedstock as defined in claim 10, wherein said web portion and said workpiece engagement surfaces lie in different, parallel planes.

17. The supply feedstock as defined in claim 10, wherein said web portions include legs which extend between said web portion interior edges and intersections of said part multiple edges.

18. The supply feedstock as defined in claim 10, wherein said workpieces include multiple edges which cooperatively define said workpiece machine engagement surfaces, said workpieces further including multiple sidewalls extending from said workpiece multiple edges, said workpiece sidewalls cooperating with said workpiece machine engagement surfaces to define partial enclosures associated with said workpieces which receive said processing machine transfer means therein.

19. The supply feedstock of claim 10, wherein said continuous coil is made of sheet metal and said workpieces are stamped and formed within said continuous coil and within said web portions by a progressive die.

20. A carrier strip of parts for use in a part processing machine which successively separates individual finished parts from the carrier strip within the part processing machine and transfers, by way of a transfer means, the separated parts to a loading station, whereupon said separated parts are successively presented to an assembling means which removes said separated parts from said part processing machine, said part processing machine further including means for sequentially advancing said carrier strip into said part processing machine, each of said parts having a usable surface which engages the transfer means of said part processing machine during and after separation from said carrier strip, said carrier strip comprising: a continuous strip of parts, the strip having a longitudinal axis and two generally parallel longitudinal outer edges, the parts being arranged in serial order along the longitudinal axis of said strip, each of said parts having multiple edges which cooperate to define a perimeter thereof, said strip further including means interconnecting said parts together extending lengthwise along said strip, the finished part interconnecting means including pairs of webs extending lengthwise only between pairs of said parts, each of said webs having opposing inner and outer edges, said webs further including planar portions disposed between said web inner and outer edges, the planar portions defining carrier strip advancement surfaces which are engaged by said part processing machine carrier strip advancement means, whereby said processing machine advancement means engages said carrier strip advancement surfaces and advances said carrier strip into said part processing machine irrespective of the plane of said part usable surfaces.

21. The carrier strip as defined in claim 20, wherein said web advancement surfaces and said part usable surfaces lie in a common plane.

22. The carrier strip as defined in claim 20, wherein said webs include leg portions extending from said web interior edges to said part edges.

23. The carrier strip as defined in claim 20, wherein said web exterior edges define portions of said longitudinal outer edges of said carrier strip and said carrier strip advancement surfaces are disposed exterior of said part edges.

24. The carrier strip as defined in claim 20, wherein said web advancement surfaces and said part usable surfaces lie in different planes.

25. The carrier strip as defined in claim 24, wherein said web advancement surfaces and said part usable surfaces lie in different, parallel planes.

26. The carrier strip as defined in claim 20, wherein said webs further include means for engaging an indexing means of said processing machine, said indexing means engaging means also being disposed within said carrier strip between said carrier strip longitudinal outer edges and said finished part edges, whereby said carrier strip also may be indexed irrespective of the plane of said part usable surfaces.

* * * * *